Sept. 11, 1928.   J. CHANDLER   1,683,866
TOOTH SCRUBBER
Filed Feb. 23, 1926
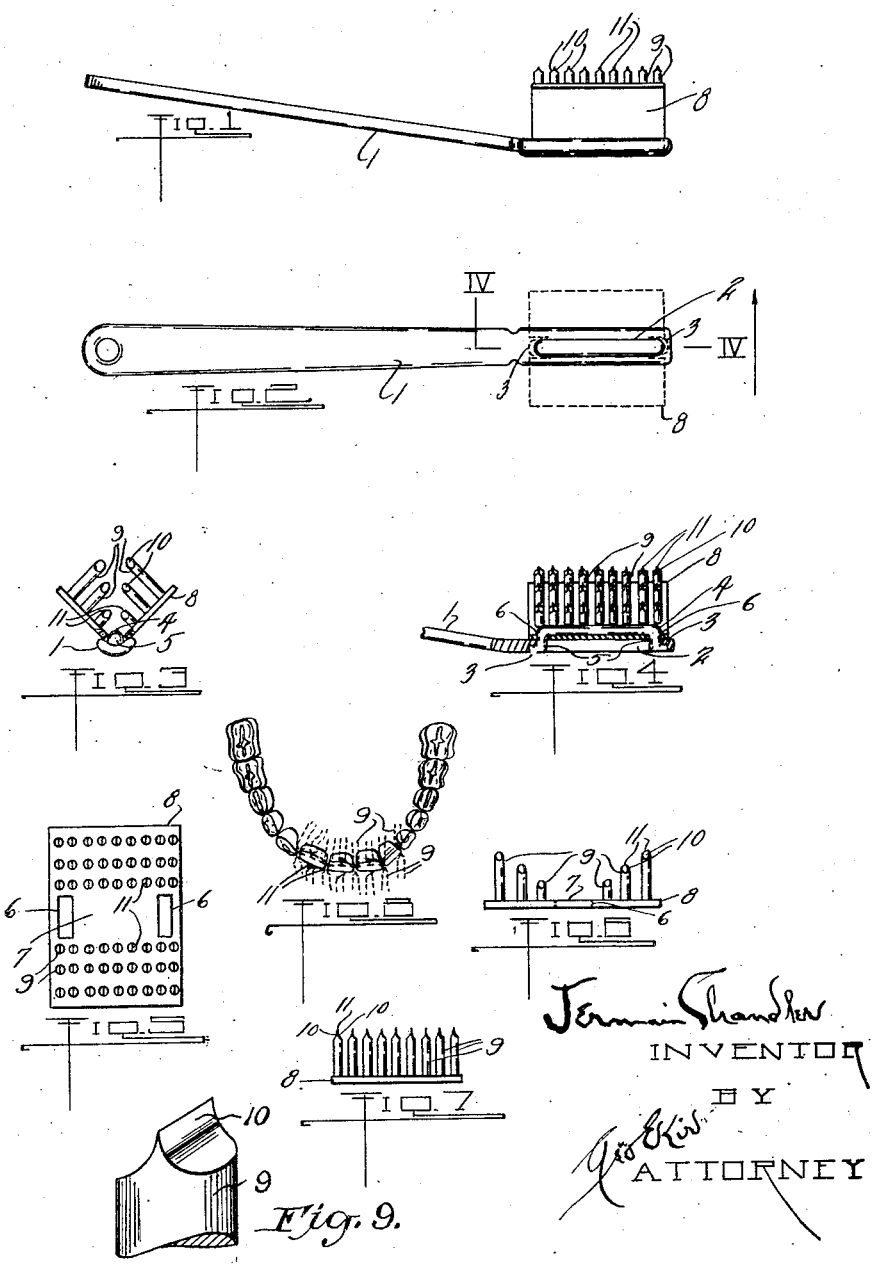

Patented Sept. 11, 1928.

1,683,866

UNITED STATES PATENT OFFICE.

JERMAIN CHANDLER, OF TOLEDO, OHIO.

TOOTH SCRUBBER.

Application filed February 23, 1926. Serial No. 90,001.

This invention relates to dental scrubbers, particularly detachable fillers for handles.

Referring to the drawings:

Fig. 1 is a side elevation of an embodiment of the invention in a tooth brush or scrubber;

Fig. 2 is a plan view of the brush handle of Fig. 1;

Fig. 3 is an end elevation of the scrubber of Fig. 1, with the filler broken away adjacent its mounting;

Fig. 4 is a section on the line IV—IV, Fig. 2, showing the filler assembled with the handle;

Fig. 5 is a plan view of the filler;

Fig. 6 is an end elevation of the filler of Fig. 5;

Fig. 7 is a side elevation of the filler of Fig. 5;

Fig. 8 is a fragmentary view showing the coaction of the prongs of the scrubber or filler for entering the recesses between the teeth of the user of this scrubber; and Fig. 9 is an enlarged perspective view of one of the prongs.

Handle 1 is shown as having near one end thereof an elongated slot 2 terminating in seats 3. Yieldable clip 4, of general U-form, has outwardly extending termini 5 which, passing through openings 6, coact with the pair of seats 3, while between these openings 6 intermediate portion 7 of rubber filler 8 is embraced to assemble such flexible rubber filler detachably with the handle 1. This action of the clip 4 in drawing the intermediate portion 7 of the filler 8 toward the slot 2 as an intermediate seat in the handle flexes wing portions of the filler 8 causing cylindrical prongs 9 of such filler to be inclined toward each other, the outermost prongs 9 being longer than those nearer the seat. These prongs have cylindrical base or body portions and upwardly terminate in oppositely arcuate sides 10 which merge toward each other to edge 11 and provide wedge faces or arcuate seats adjacent the termini for the prongs. These scrubber prongs 9 are of approximate uniform flexibility in the cylindrical portion thereof, while the double arcuate wedge portion approximates a feather edge of considerable flexibility at its tip with a degree of strengthened flexibility toward the cylindrical portion 9. These wedge portions in the rows of the prongs are disposed to align transversely of the handle so that as this scrubber is inserted in the mouth, oscillation of the scrubber by rocking the handle on its lengthwise axis will allow these wedges to move up and down between the teeth and thus serve as effective agents for clearing the teeth of tartar, as well as food particles or foreign matter. The action of the prongs when the handle is reciprocated lengthwise is an effective scrubbing action or polisher for the teeth, and when this flexible prong structure is made of rubber, the action is really a polishing and mild scrubbing action without tendency to lacerate the gums.

The filler is one which may be readily assembled in the handle structure, and accordingly with a handle supplied, there may be replacements with fillers of varying sizes, or when damaged, replacement with a complete filler. These fillers are sanitary, as well as the brush as a unit, and are susceptible of ready cleansing.

The filler is quickly attached to the handle by placing the portion of the filler over the slot 2 with the filler openings 6 near the slot terminals. One terminal 5 of the clip 4 is then thrust through the openings 6 of the filler body to have one of its termini enter a seat 3 and the remote terminus offset sprung into the other seat 3 due to the flexibility of both the clip and the filler.

The efficient mode for cleansing teeth is by rubbing the teeth lengthwise or by up and down motion so that the brush prongs or bristles may enter between the teeth and foreign matter be engaged and brushed lengthwise therefrom. To this end the concave fin-forming edges 11 of the prongs 9 are so disposed as to present such edges in a direction to enter effectively between the teeth.

What is claimed and it is desired to secure by United States Letters Patent is:

1. A tooth scrubber comprising a base, and a plurality of flexible prongs rising therefrom, each prong having a cylindrical body portion terminating at its free end in an edge, said prongs each having concave seats one on each side of said edge merging into said cylindrical portion.

2. A tooth scrubber comprising a handle with a slot, a seat in each end of the slot, a flexible clip adapted to engage the seats, and to secure a flexible brush head between said clip and the sides of the slot.

In witness whereof I affix my signature.

JERMAIN CHANDLER.